United States Patent [19]
Yang

[11] Patent Number: 5,909,293
[45] Date of Patent: Jun. 1, 1999

[54] HOLOGRAM UNIT OF OPTICAL PICKUP AND METHOD OF ATTACHING HOLOGRAM PLATE USING THE SAME

[75] Inventor: Keun Young Yang, Kyungki-do, Rep. of Korea

[73] Assignee: LG Electronics, Inc., Seoul, Rep. of Korea

[21] Appl. No.: 08/772,468

[22] Filed: Dec. 23, 1996

[30] Foreign Application Priority Data

Dec. 28, 1995 [KR] Rep. of Korea .................. 95-62077

[51] Int. Cl.[6] .................. G03H 1/00; G02B 5/32
[52] U.S. Cl. .................. 359/1; 359/15; 359/25
[58] Field of Search .................. 359/1, 15, 25, 359/573; 356/138, 399; 369/112, 109, 44.11; 250/205, 216; 257/443

[56] References Cited

U.S. PATENT DOCUMENTS 5,523,993  6/1996  Freeman .................. 250/201.5
5,648,951  7/1997  Kato et al. .................. 369/112

*Primary Examiner*—Cassandra Spyrou
*Assistant Examiner*—Jared Treas
*Attorney, Agent, or Firm*—John P. White; Cooper & Dunham LLP

[57] ABSTRACT

Disclosed are a hologram unit of an optical pickup which has a main hologram and auxiliary alignment holograms around the main hologram thereof and a method of attaching a hologram plate of the optical pickup comprising the steps of: illuminating an object with an LD; forming an LD radiant point on a monitor through a microscopic lens, and a plurality of radiant points around the LD radiant point by auxiliary alignment holograms; and aligning the LD with the hologram plate by moving the hologram plate so as to form the LD radiant point in the center of the plurality of radiant points.

2 Claims, 5 Drawing Sheets

HOLOGRAM UNIT OF OPTICAL PICKUP AND METHOD OF ATTACHING HOLOGRAM PLATE USING THE SAME

BACKGROUND OF THE INVENTION

1. Field of the Invention

The present invention relates to an optical pickup which is a device for recording and regenerating light information and, more particularly to a hologram unit of an optical pickup whose hologram plate is attachable thereto in a precise and prompt manner and a method of attaching the hologram plate by using the hologram unit.

2. Discussion of Related Art

An optical pickup is generally used as a device for reading out light information from an optical disk. Among various optical pickups of such a performance, a hologram unit which employs a hologram plate is illustrated in FIG. 1. The hologram unit largely includes a light source for reading out light information recorded on an optical disk 1 and an output device for providing a servo signal and a light information signal which drives an object lens 2 so as to read out the light information in a more accurate manner.

FIG. 2 shows a detailed construction of the hologram unit, which comprises a laser diode 3 (hereinafter, referred to as an "LD") for regularly generating a given front and back light, a monitor photodiode 4 (hereinafter, referred to as an "MPD") receiving the back light of the LD 3 and controlling the LD 3 to regularly emit a light beam, a multi-split photodiode 5 (hereinafter, referred to as a "PD") receiving the light information from the optical disk 1 and processing its corresponding signal, a stem 6 for supporting these photoelectric elements 3, 4 and 5, a protective cap 7 for safely covering the photoelectric elements, and a hologram plate 8 provided on the top surface of the cap 7 so as to transmit and diffract the light of the LD 3.

In the operation of this optical pickup, a driving section (not shown) drives the LD 3 to generate a front light to the hologram plate 8 and a back light to the PD 5.

The light beam launched on the hologram plate 8 is transmitted to the optical disk 1 via the object lens 2 so as to read out the light information of the optical disk 1. In addition, the light beam transmitted to the MPD 4 is converted to an electric signal, which is then used in the driving section (not shown) for controlling the LD 3 to regularly generate a light. The light information reflected from the optical disk 1 is fed back to the hologram plate 8 and refracted to the PD 5, where the refracted light is properly processed and reproduced.

The performance of this optical pickup depends on the precise attachment of the hologram plate 8, and as shown in FIG. 3, the hologram plate 8 forms a hologram 9 in the center of a perfect square thereon and, at the edges of the hologram 9, has four marks 10 whose extension lines altogether form a right cross mark.

According to the prior art, as shown in FIGS. 3 and 4, the radiant point 3a of the LD 3 is focused on the central point of the cross mark of a monitor 12 preadjusted by an observation microscopic lens 11, and the microscopic lens 11 is then moved right over the cross mark 10 on the hologram plate 8.

After the right cross mark (+) shown through the microscopic lens 11 is adjusted to the cross mark 10 on the hologram plate 8, the hologram plate 8 is attached to a predetermined region of the cap 7. In other words, the right cross mark (+) indicated by the radiant point 3a of the LD 3 is adjusted to the mark 10 on the hologram plate 8 by moving the microscopic lens 11 up and down. Then, the hologram plate 8 is attached at the point where the two marks meet.

Such an adjustment of the two marks and the subsequent attachment of the hologram plate 8 is attainable when the optical axis 8a passing the radiant point 3a of the LD 3 and the central point of the hologram plate 8 is in accordance with the optical axis 11a of the microscopic lens 11, as illustrated in FIG. 4.

In a reverse bias, if the LD 3 is not accurately aligned with the hologram plate 8, the optical axis 11a cannot meet the connection line of the radiant point 3 of the LD 3 and the optical axis 8a only by moving the microscopic lens 11 up and down, as shown in FIG. 5. Therefore, there may occur an error in the arrangement of components because the reality is different from the correlation between the image 3a' of the LD radiant point 3a shown on the predetermined cross mark (+) of the monitor 12 and the images 9' and 10' of the marks displayed on the hologram plate 8, as illustrated in FIGS. 6A and 6B.

In the prior art, the hologram plate can be precisely attached by moving the microscopic lens 11 up and down once or more when the above two light axes perfectly meet each other. However, a problem may be encountered with a false alignment of the two axes, so that it is necessary to additionally adjust the axes to be in accordance with each other and it leads to the deterioration of the hologram.

SUMMARY OF THE INVENTION

Accordingly, the present invention is directed to a hologram unit of an optical pickup and a method of attaching the hologram plate by using the hologram unit that substantially obviates one or more of the problems due to limitations and disadvantages of the related art.

An object of the present invention is to provide a hologram unit of an optical pickup which is designed to have an accurate alignment of an LD and a hologram plate and a method of attaching the hologram plate by using the hologram unit.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the hologram unit of an optical pickup has a main hologram and auxiliary alignment holograms around the main hologram thereof. Further, the method of attaching a hologram plate of the optical pickup, comprises the steps of: illuminating an object with an LD; forming an LD radiant point on a monitor through a microscopic lens, and a plurality of radiant points around the LD radiant point by auxiliary alignment holograms; and aligning the LD with the hologram plate by moving the hologram plate so as to form the LD radiant point in the center of the plurality of radiant points.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

DETAILED DESCRIPTION OF PREFERRED EMBODIMENT

Reference will now be made in detail to the preferred embodiments of the present invention, examples of which are illustrated in the accompanying drawings.

Figure 1:
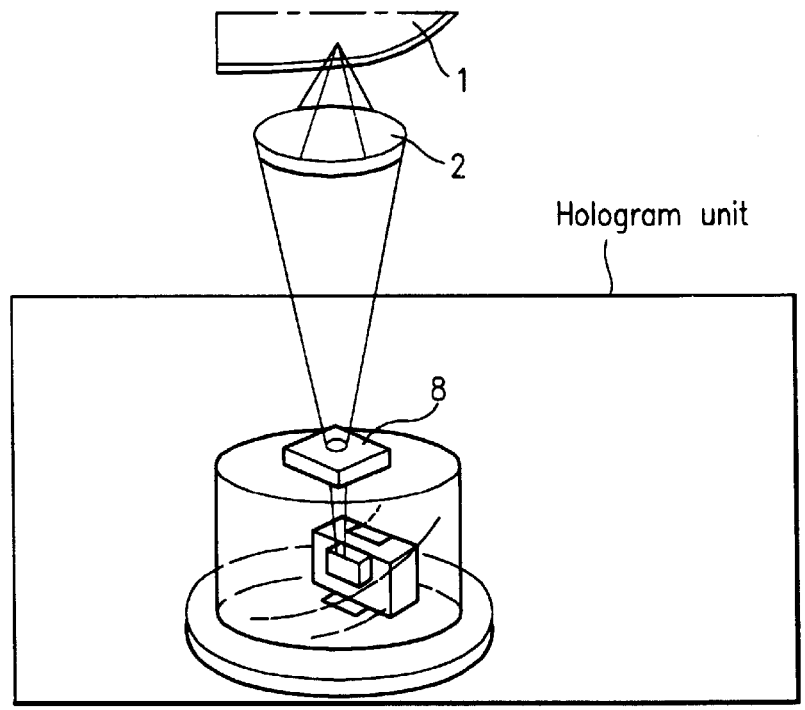
FIG. 1 shows a construction of a general optical pickup.
Figure 2:
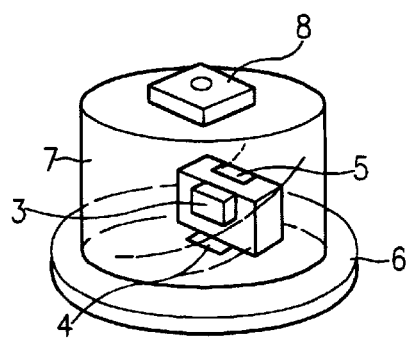
FIG. 2 is a plan view of the hologram unit of the general optical pickup.
Figure 3:
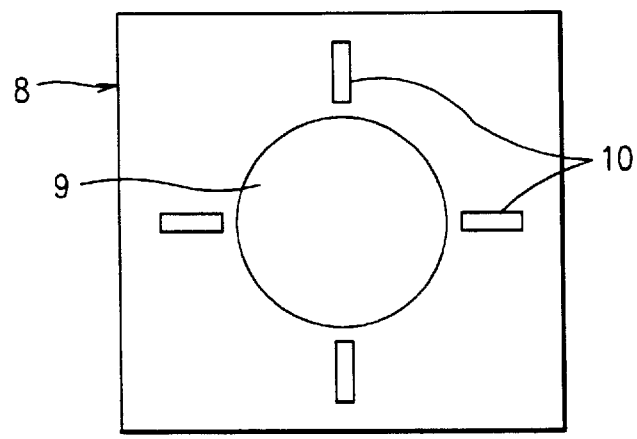
FIG. 3 is a plan view of a conventional hologram plate.
Figure 4:
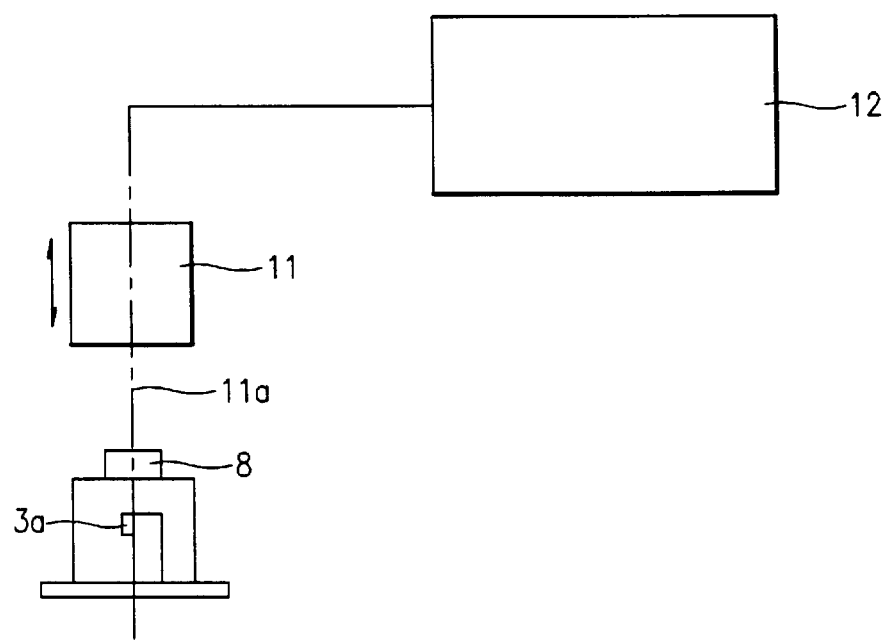
FIG. 4 illustrates an attachment of the hologram plate by means of the hologram unit of a conventional optical pickup.
Figure 5:
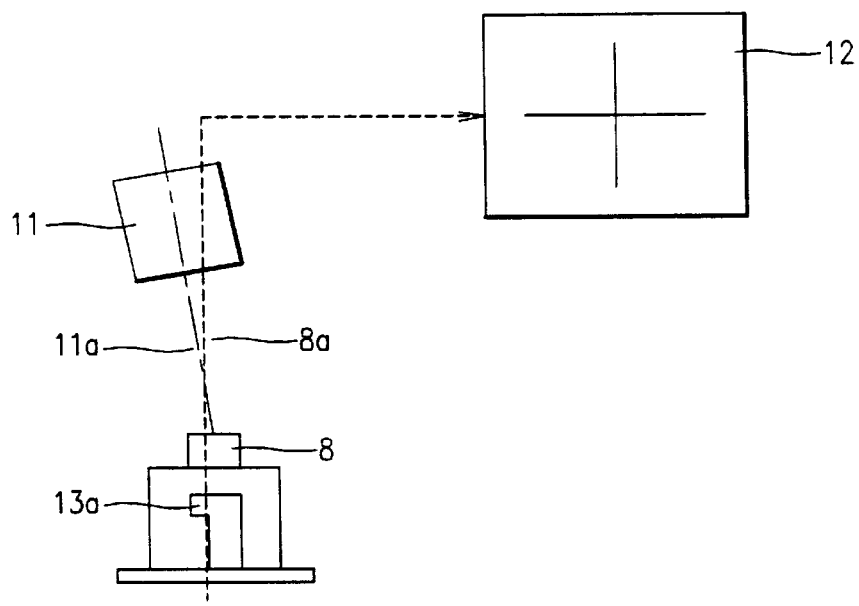
FIG. 5 illustrates another attachment of the hologram plate by means of the hologram unit of the conventional optical pickup.
Figure 6A:
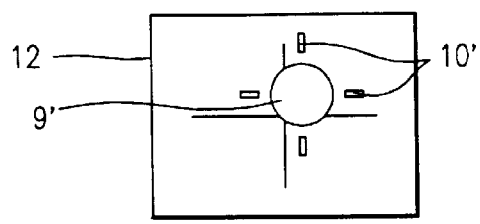
FIG. 6A shows the image of a hologram projected on the hologram plate of FIG. 5.
Figure 6B:
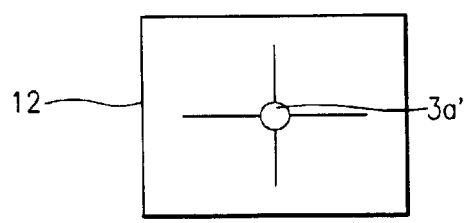
FIG. 6B shows the image of an LD radiant point projected on the hologram unit of FIG. 5.
Figure 7:
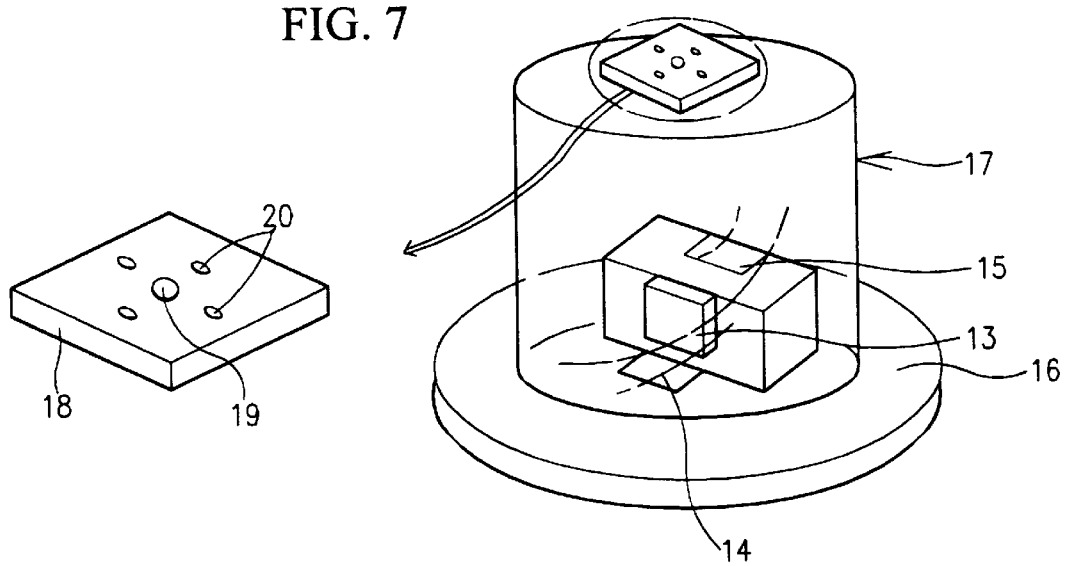
FIG. 7 shows a construction of a hologram unit of the optical pickup according to the present invention.
Figure 8A:
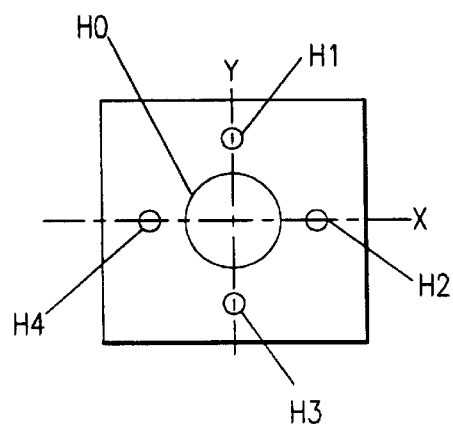
FIGS. 8A and 8B show the radiant points of object and reference beams generated from the hologram plates aligned according to the present invention.
Figure 8B:
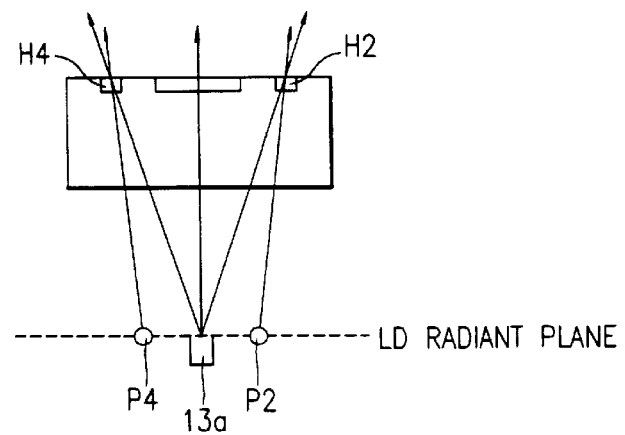
Figure 9:
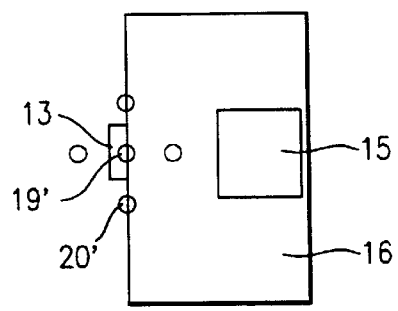
FIG. 9 illustrates the correlation between scattering points of the object beam and an LD radiant point of the hologram for alignment according to the present invention.

FIG. 7 shows a construction of a hologram unit of the optical pickup according to the present invention, and FIGS. 8A and 8B show the radiant points of object and reference beams generated from the hologram plates aligned in accordance with the present invention. Further, FIG. 9 illustrates the correlation between scattering points of the object beam and an LD radiant point of the hologram for alignment according to the present invention.

The present invention comprises a main hologram 19 on a hologram plate 18 and four alignment holograms 20 so as to form a right cross mark corresponding to the reference coordinates 12a of a monitor 12 around the main hologram.

Therefore, these four alignment holograms 20 pass a reference beam of an LD radiant point 13a as a beam diffracted by a given angle, and forms an optical axis of radiant points which are formed in the same plane of the LD radiant point 13a at a given distance from the LD radiant point 13a in the directions of +X, -X, +Y and -Y.

As shown in FIG. 8, the diffracted radiant points H2 and H4 of the alignment holograms form radiant points P2 and P4 at a given distance from the LD radiant point 13a in the directions of +X, -X. The present invention has a hologram plate 18 which comprises a main hologram 19 and auxiliary alignment holograms 20 so as to exhibit a diffractive property that the light actually generated from the LD radiant point 13a appears to have been generated from the radiant points P2 and P4.

To have such a diffraction, the hologram has two light sources to generate two incident light beams thereto in different directions so as to have a light beam of one direction through a diffraction.

The hologram unit of the present invention has the same construction as in a prior art in that it includes photoelectric elements comprising an LD 13, an MPD 14 and a multi-split PD 15, a stem 16 for supporting the photoelectric elements, and a cap 17 for protectively covering the photoelectric elements.

Figure 10:
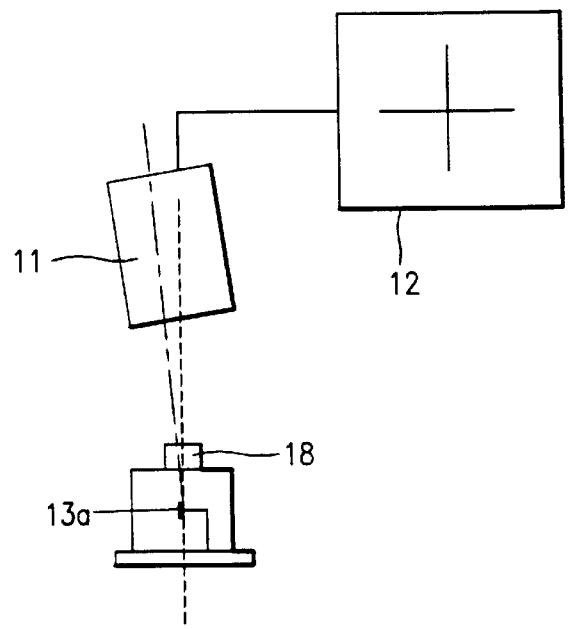
FIG. 10 illustrates a method of attaching the hologram plate according to the present invention.
Figure 11A:
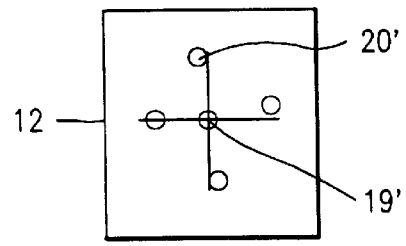
FIG. 11A shows the image of the LD radiant point projected on the hologram unit before the alignment of the hologram of FIG. 10.
Figure 11B:
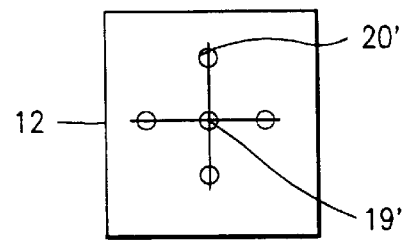
FIG. 11B shows the image of the LD radiant point projected on the hologram unit after the alignment of the hologram of FIG. 10.

The method of attaching a hologram by using the above hologram unit of an optical pickup is illustrated in FIGS. 9 through 11. First, the LD 13 illuminates an object by a driving section (not shown) so as to generate an incident light from the radiant point thereof to the hologram 19 and alignment holograms 20. Then, there are projected, in a right cross form, the radiant point 19' of the LD 13 and that 20' of its diffracted beam, as shown in FIG. 9.

These radiant points make an image on the predetermined right cross mark on the monitor through the microscopic lens 11. Therefore, the radiant points 20' which passed the given right cross mark (+) in the form of oblique coordinates appear around the radiant point 19' of the LD 3.

With this, the hologram plate 18 is moved so as to make the radiant point 19' of the LD 13 in the center of the four radiant points 20' diffracted by the holograms 20 for alignment.

In FIG. 10, even when the optical axis of the microscopic lens is not in accordance with that of the radiant, it is possible to know the accurate locations of the LD radiant point and the radiant point for alignment because they are all in the same plane. Thus, we can precisely align the hologram plate 18 by using the radiant points forming a right cross mark.

As illustrated above, the present invention is designed to have the diffracted radiant points of the alignment holograms and the LD radiant point in the same plane so as to display all of them in the monitor without moving the microscopic lens up and down.

It will be apparent to those skilled in the art that various modifications and variations can be made in the hologram unit of an optical pickup and a method of attaching the hologram plate by using the hologram unit according to the present invention without departing from the spirit or scope of the invention. Thus, it is intended that the present invention cover the modifications and variations of this invention provided they come within the scope of the appended claims and their equivalents.

What is claimed is:

1. A hologram unit of an optical pickup which comprises a photo element supported by a stem, a protective cap surrounding the photo element and a hologram plate attached onto the top surface of the protective cap, the hologram unit having a main hologram for a servo signal, and auxiliary alignment holograms around the main hologram for alignment of the main hologram, wherein the auxiliary alignment holograms are provided in the same plane at a given distance from the main hologram in the directions of +X, -X, +Y and -Y, and wherein a reference beam of the auxiliary alignment holograms is a LD radiant point and radiant points of object beams of the auxiliary alignment holograms are respectively located in the same plane at a given distance from the LD radiant point in the directions of +X, −X, +Y and −Y.

2. A method of attaching a hologram plate of a hologram unit for optical pickup, comprising the steps of:

illuminating an object with a LD;

forming a LD radiant point on a monitor through a microscopic lens, and a plurality of radiant points around the LD radiant point by auxiliary alignment holograms; and aligning the hologram plate by moving the hologram plate so as to locate the LD radiant point in a center of the plurality of radiant points and aligning the hologram plate by moving the hologram plate so as to locate the plurality of radiant points on an axis of a predetermined mark displayed on the monitor.

* * * * *